United States Patent
Natsume (10) Patent No.: US 8,238,957 B2
(45) Date of Patent: Aug. 7, 2012

(54) COMMUNICATION CONTROL METHOD, COMMUNICATION CONTROL SYSTEM AND ITS CONTROL PROGRAM

(75) Inventor: Kouhei Natsume, Tokyo (JP)

(73) Assignee: NEC Corporation, Tokyo (JP)

( * ) Notice: Subject to any disclaimer, the term of this patent is extended or adjusted under 35 U.S.C. 154(b) by 757 days.

(21) Appl. No.: 11/917,790

(22) PCT Filed: Jun. 9, 2006

(86) PCT No.: PCT/JP2006/312091
§ 371 (c)(1),
(2), (4) Date: Dec. 17, 2007

(87) PCT Pub. No.: WO2006/135037
PCT Pub. Date: Dec. 21, 2006

(65) Prior Publication Data
US 2009/0131094 A1 May 21, 2009

(30) Foreign Application Priority Data
Jun. 17, 2005 (JP) .................. 2005-178570

(51) Int. Cl.
| | |
|---|---|
| H04B 1/00 | (2006.01) |
| H04B 7/00 | (2006.01) |
| H04B 7/185 | (2006.01) |
| H04B 7/216 | (2006.01) |
| H04B 1/38 | (2006.01) |
| H04W 4/00 | (2009.01) |
| H04W 36/00 | (2009.01) |
| H04W 72/00 | (2009.01) |
| G01R 31/08 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| G06F 3/033 | (2006.01) |

(52) U.S. Cl. .......... 455/522; 455/442; 455/69; 455/450; 455/452.2; 455/561; 370/318; 370/333; 370/335; 370/252; 370/342

(58) Field of Classification Search .................. 455/522, 455/130, 442, 69, 450, 452.2, 561; 370/318, 370/333, 335, 252, 342
See application file for complete search history.

(56) References Cited

U.S. PATENT DOCUMENTS
5,638,361 A * 6/1997 Ohlson et al. ................. 370/342
(Continued)

FOREIGN PATENT DOCUMENTS
CN 1364356 A 8/2002
(Continued)

OTHER PUBLICATIONS

PCT/JP2006/312091 International Search Report, mailed Sep. 5, 2006.
(Continued)

Primary Examiner — Bobbak Safaipour (57) ABSTRACT

In a communication control method which realizes the quick and stable provision of a service by increasing efficiency in transmission power control, a target SIR setting part 18 controls downlink transmission power from a base station so that the T-SIR will be equal to the SIR measured in a known inner loop, by increasing a target signal interference ratio (T-SIR) by a first predetermined value when a reception field level of a common pilot channel before the establishment of synchronization of a dedicated control channel, which is provided by the quality measurement part 12, falls below a first threshold selected by a target quality setting part 14 depending on the reception quality of a DPDCH, and decreasing the target signal interference ratio (T-SIR) by a second predetermined value when the reception field level of the common pilot channel exceeds a second threshold selected by the target quality setting part 14 depending on the reception quality of the DPDCH.

13 Claims, 8 Drawing Sheets

U.S. PATENT DOCUMENTS

| | | | | |
|---|---|---|---|---|
| 6,195,343 | B1* | 2/2001 | Watanabe | 370/335 |
| 6,957,070 | B2* | 10/2005 | Voyer | 455/450 |
| 7,206,596 | B2* | 4/2007 | Nishio | 455/522 |
| 7,310,528 | B2* | 12/2007 | Natsume | 455/437 |
| 7,483,709 | B2* | 1/2009 | Kondo | 455/522 |
| 7,796,552 | B2* | 9/2010 | Julian et al. | 370/331 |
| 7,877,098 | B2* | 1/2011 | Ryu et al. | 455/446 |
| 7,933,235 | B2* | 4/2011 | Lott et al. | 370/328 |
| 2002/0102981 | A1* | 8/2002 | Jechoux | 455/450 |
| 2002/0115467 | A1* | 8/2002 | Hamabe | 455/522 |
| 2003/0076796 | A1* | 4/2003 | Kondo | 370/332 |
| 2005/0043051 | A1* | 2/2005 | Takano et al. | 455/522 |
| 2005/0221827 | A1* | 10/2005 | Natsume | 455/437 |
| 2008/0167044 | A1* | 7/2008 | Natsume | 455/437 |
| 2008/0311948 | A1* | 12/2008 | Hans et al. | 455/522 |

FOREIGN PATENT DOCUMENTS

| | | |
|---|---|---|
| JP | 2001136123 A | 5/2001 |
| JP | 2002016545 A | 1/2002 |
| JP | 2002026808 A | 1/2002 |
| JP | 2002325063 A | 11/2002 |
| JP | 2003244071 A | 8/2003 |
| JP | 2004207968 A | 7/2004 |
| WO | 2004004163 A1 | 1/2004 |
| WO | 2004019519 A1 | 3/2004 |

OTHER PUBLICATIONS

Chinese Office Action for CN200680021688.5 dated Jan. 28, 2011.

* cited by examiner

COMMUNICATION CONTROL METHOD, COMMUNICATION CONTROL SYSTEM AND ITS CONTROL PROGRAM

TECHNICAL FIELD

The present invention relates to a communication control method, a communication control system and its control program. More particularly, the invention relates to a communication control method, a communication control system and its control program that variably sets the communication quality of a second communication line according to the reception condition of a previously established first communication line.

BACKGROUND ART

When a user receives a general service, such as audio communication, packet communication or videophone, in a mobile terminal over a mobile communication network, the quality of the service being provided varies depending on the condition of radio waves (e.g., reception field level) from a base station. The user would receive the service at a high quality level if he/she is located near the base station. The quality of the service tends to deteriorate if the user is located far from a base station.

As a technical solution to avoid inconveniences caused by this problem, a typical related art W-CDMA (W-Code Division Multiple Access) system uses a transmission power control system that maintains a required SIR (Signal Interference Ratio) at a predetermined level in order to stabilize communication quality (hereinafter also called a "related art transmission power control system").

Such a transmission power control system is designed to control an increase or decrease in downlink transmission power (i.e., power transmitted from a base station to a mobile terminal) after DCH (Dedicated Control Channel) synchronization is established, so that the measured quality (M-SIR) of the communication channel over which radio waves are being received will be equal to a target ratio of received signal power to interference power (T-SIR). The system is configured to begin control of the T-SIR value at an initial value (T-SIR) predetermined individually for each bearer (i.e., a communication medium, such as a voice call (AMR), packet (PKT), videophone (UDI=AV) or audio+packet (Multicall)).

Figure 8:
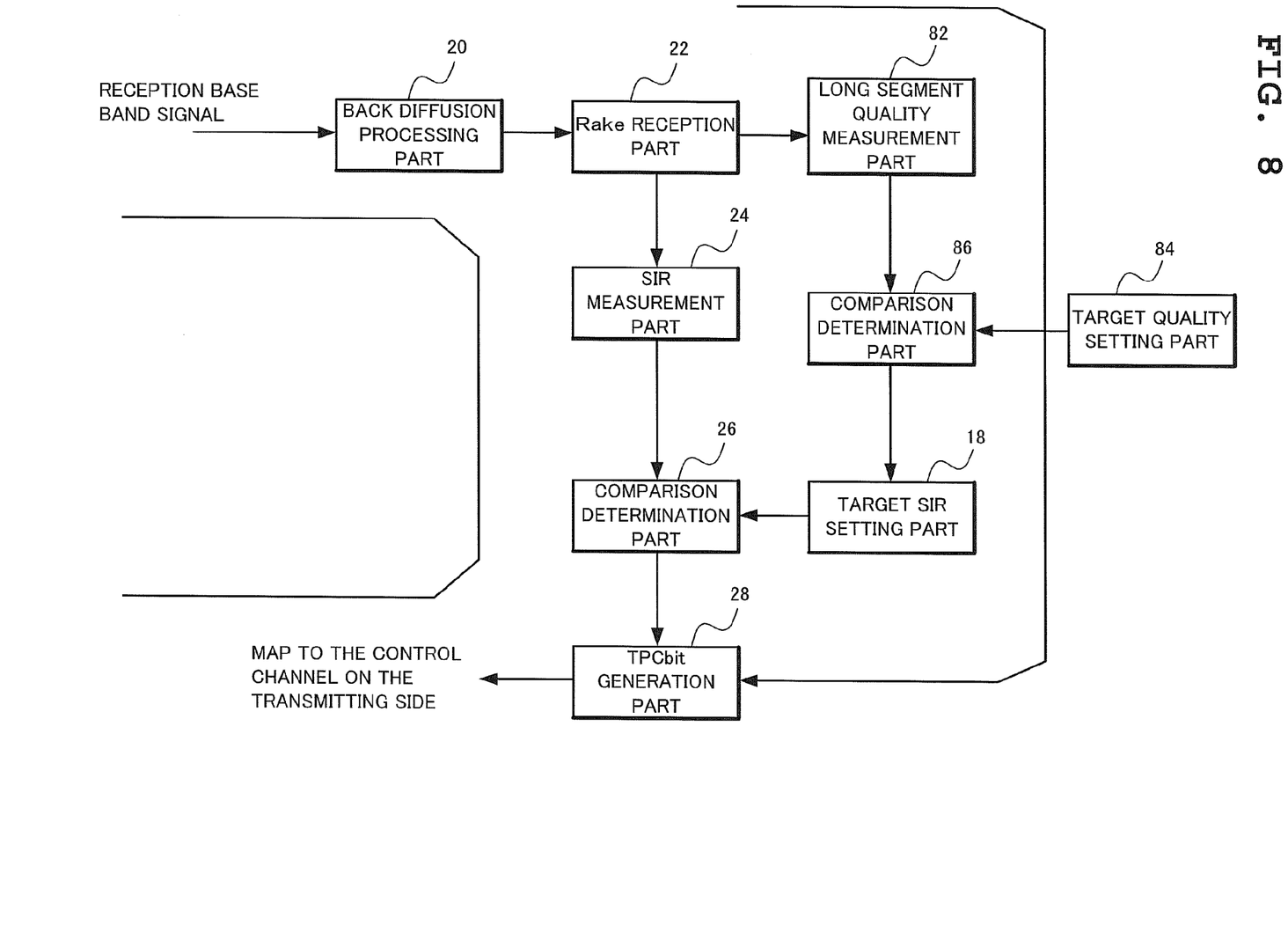
FIG. 8 is a block diagram of an example of a related art transmission power control system.

More specifically, as shown in FIG. 8, during the control process for T-SIR by the transmission power control system described above, a long segment quality measurement part 82 placed in the outer loop measures the reception quality of a long segment (several hundreds of milliseconds to several seconds). After DCH synchronization is established, the preset initial value outputted from a target quality setting part 84 is updated with a measured reception quality value (BLER: Block Error Ratio, or BER: Bit Error Ratio) for a DPDCH (Dedicated Physical Data Channel) in a DPCH (Dedicated Physical Channel), which is measured by the long segment quality measurement part 82. A comparison determination part 86 determines whether or not the desired BLER is being achieved by comparing the measured reception quality value against the value from the target quality setting part 84, and provides the determination result to a target SIR setting part 18. In this way, the system compensates the T-SIR with slow periodicity, thereby achieving the control of downlink transmission power.

A T-SIR from the target SIR setting part 18 is transmitted to a comparison determination part 26 in a known inner loop (which comprises a back diffusion processing part 20, a Rake reception part 22, an SIR measurement part 24, a comparison determination part 26, and a TPC bit generation part 28). Based on the determination result from the comparison determination part 26, the TPC bit generation part 28 maps a TPC (Transmit Power Control) bit to a DPCCH (Dedicated Physical Control Channel) and transmits it to a base station via DPCCH. The TPC bit is used to control downlink transmission power from the base station.

Figure 9:
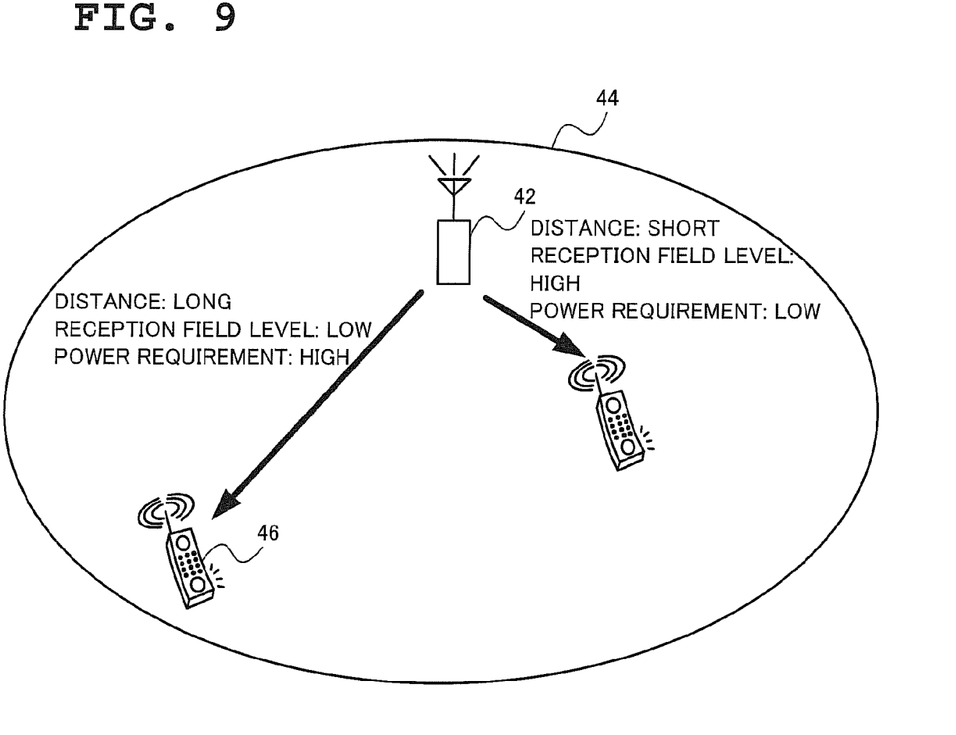
FIG. 9 is a diagram illustrating drawbacks of the related art transmission power control system shown in FIG. 8.

The purpose of controlling the T-SIR in this manner is as follows: If a user is located near a base station, a service can be provided stably with low transmission power. However, as the user moves away from the base station, it becomes increasingly difficult to maintain the desired communication quality due to deterioration in the radio wave propagation environment, consequently leading to a decreased quality of the service being provided. In order to avoid inconveniences caused by this problem, the T-SIR for a mobile terminal 46 located far from a service area 44 of a base station 42 is heightened to increase downlink transmission power in order to improve, or at least maintain, communication quality and eventually to ensure stable provision of services in a sustainable manner, as shown in FIG. 9.

Literature 1 (Japanese Patent Laying-Open No. 2002-016545) discloses an art in which an apparatus on the receiving side controls transmission power from the transmitting side periodically, so that the SIR or reception power of a received signal from a sender of interest will be equal to a predetermined target reception SIR value or a target reception power value. In this art, the apparatus on the receiving side detects a reception error rate (reception bit error rate or reception frame error rate) of the received signal from the sender of interest, and compares the detected reception error rate against a predetermined target reception error rate on the receiving-side terminal. Based on the result of comparison, the apparatus compensates the target reception SIR value or the target reception power value.

Literature 2 (Japanese Patent Laying-Open No. 2004-207968) discloses a receiving apparatus for a base station, which includes a finger part that outputs an estimated SIR value and the number of GAPs, a decode part that outputs PILOT bit information (the number of error PILOTs) for each of the time slots of a wireless frame, and an SIR threshold offset calculation part which calculates an SIR offset value by adding a predetermined SIR threshold to the number of GAPs outputted from the finger part and the number of PILOTS for each time slot outputted from the decode part, and which is equipped with a synchronization determination part which makes a determination of frame synchronization based on the estimated SIR value outputted from the finger part, the PILOT bit information for the wireless frame outputted from the decode part and the SIR offset value outputted from the SIR threshold offset calculation part.

As described above, the control process performed by a typical related art transmission power control system begins after DCH synchronization is established for each terminal. The initial value of T-SIR used in this control process is a fixed value determined individually for each bearer. Although the initial value is determined by the manufacturer of each system based on many measurement data, the value thus determined is a fixed one and therefore it does not consider actual radio wave conditions and thus communication quality is easily affected by the propagation environment after DCH synchronization is established.

For example, if the radio wave condition, e.g., reception field, is poor when synchronization is established, the M-SIR will not be sufficient and errors will inevitably occur due to poor communication quality, making it difficult to receive services stably. In this situation, the user terminal must continue to request the base station for downlink transmission power to increase the T-SIR for better communication quality until a sufficient level of M-SIR is reached. It requires some time before the user can receive the stable provision of a service.

Conversely, in an environment with a high reception field, the service quality is excessive and the base station must perform control to decrease the T-SIR in order to optimize (increase) the system capacity by lowering downlink transmission power. This increases overhead of the base station with respect to system capacity.

Similarly to the above-described transmission power control system, the related art of Literature 1 controls transmission power from the transmitting side periodically so that the SIR or reception power of a received signal will be equal to a specific predetermined target reception SIR value or target reception power value, and in doing so it compensates the target reception SIR value or the target reception power value based on the result of comparing the detected reception error rate against the predetermined target reception error rate on the receiving-side terminal. However, Literature 1 uses a predetermined target reception error rate for comparison and therefore it potentially holds a technical problem similar to that of the above-described related art transmission power control system.

The art of Literature 2 as well has a similar problem because it uses a predetermined SIR threshold to calculate an SIR offset value.

Developed in light of the above-described circumstances, the purpose of the present invention is to provide a communication control method, a communication control system and its control program that contribute to the provision of communication services stably and so forth.

SUMMARY

According to a first exemplary aspect of the invention, a communication control method to control transmission power through a first wireless channel which connects between a first wireless communication apparatus and a second wireless communication apparatus, includes establishing a second wireless channel which connects between the first wireless communication apparatus and the second wireless communication apparatus, the second wireless communication apparatus receiving a signal sent from the first wireless communication apparatus via the second wireless channel, and controlling signal transmission power through the first wireless channel according to the reception condition of the signal.

According to a second exemplary aspect of the invention, a communication control system, comprising a first measurement unit to measure the signal interference ratio of a first wireless channel which is established with a base station; a setting unit to set a target signal interference ratio required for communication via the first wireless channel; and a control unit to control transmission power transmitted from the base station via the first wireless channel based on the signal interference ratio measured by the first measurement unit and the target signal interference ratio set by the setting unit; wherein a second measurement unit is provided to measure the reception condition of a signal through a second wireless channel which is established with a base station before the first wireless channel is established; and the target signal interference ratio set by the setting unit is variably set according to the reception condition of the signal which is measured by the second measurement unit.

EXEMPLARY EMBODIMENT

The present invention is configured so that, when controlling transmission power through a first wireless channel established between a first wireless communication apparatus and a second wireless communication apparatus, the reception condition of a signal received via a second wireless channel established between the first wireless communication apparatus and the second wireless communication apparatus is measured before the first wireless channel is established and then transmission power for the first wireless channel is controlled according to the reception condition of the measured signal and the threshold value determined by the reception error rate.

First Exemplary Embodiment

Figure 1:
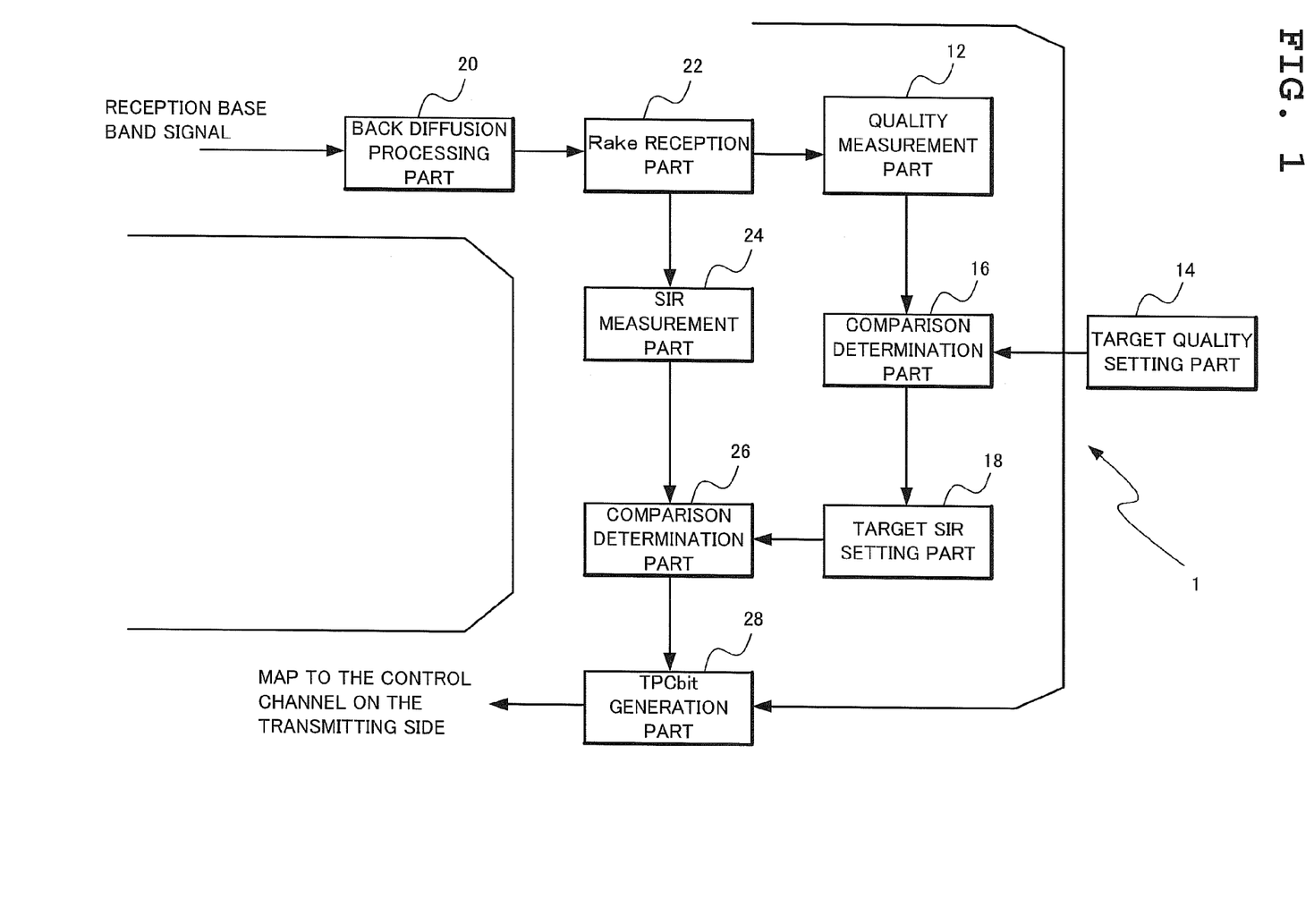
FIG. 1 is a block diagram of a communication control system to be equipped in a mobile terminal according to a first exemplary embodiment of the invention.
Figure 2:
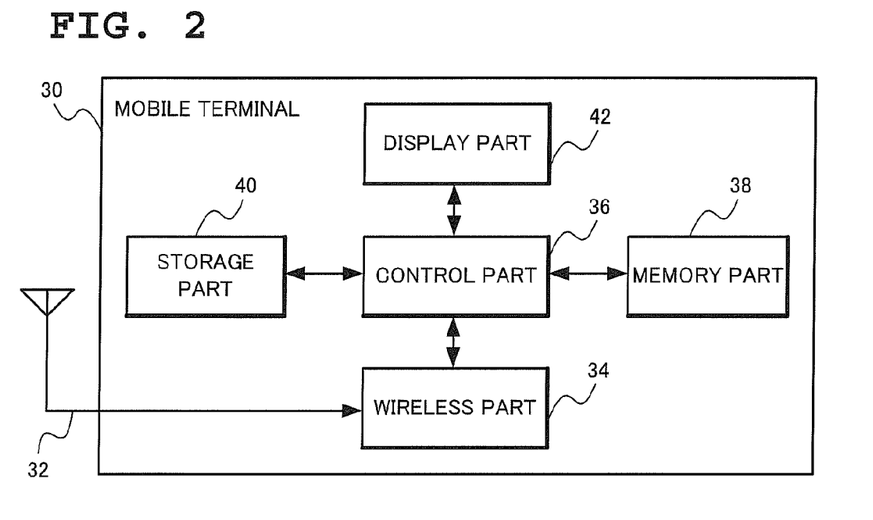
FIG. 2 is a diagram showing the electrical configuration of a mobile terminal equipped with the communication control system according to the first exemplary embodiment.
Figure 3:
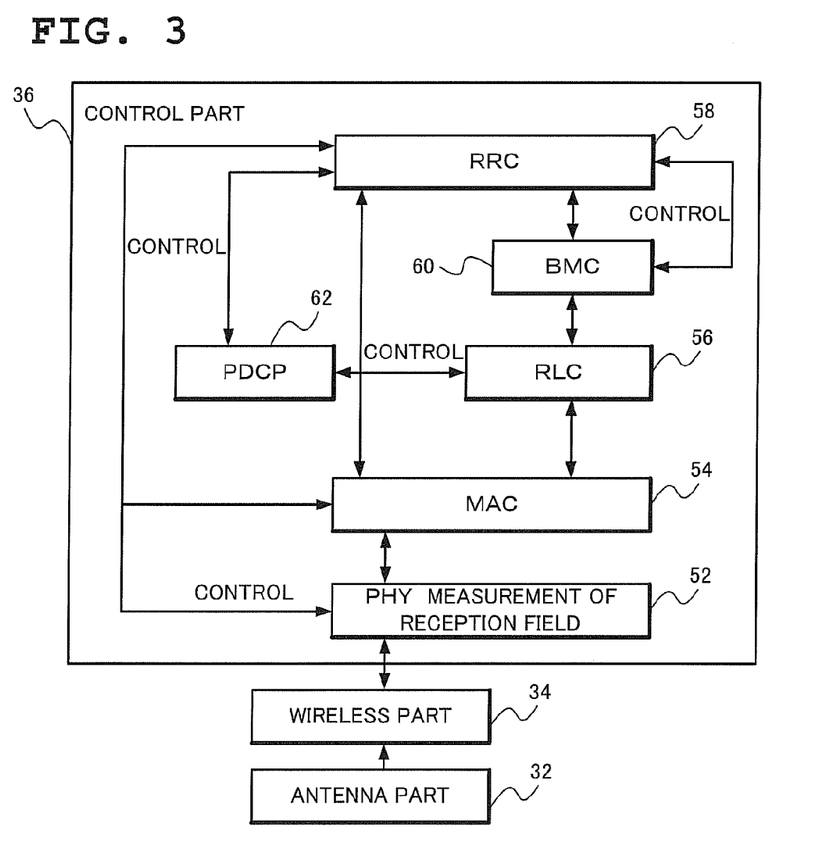
FIG. 3 is a diagram showing the configuration of the control part of the mobile terminal equipped with the communication control system according to the first exemplary embodiment.
Figure 4:
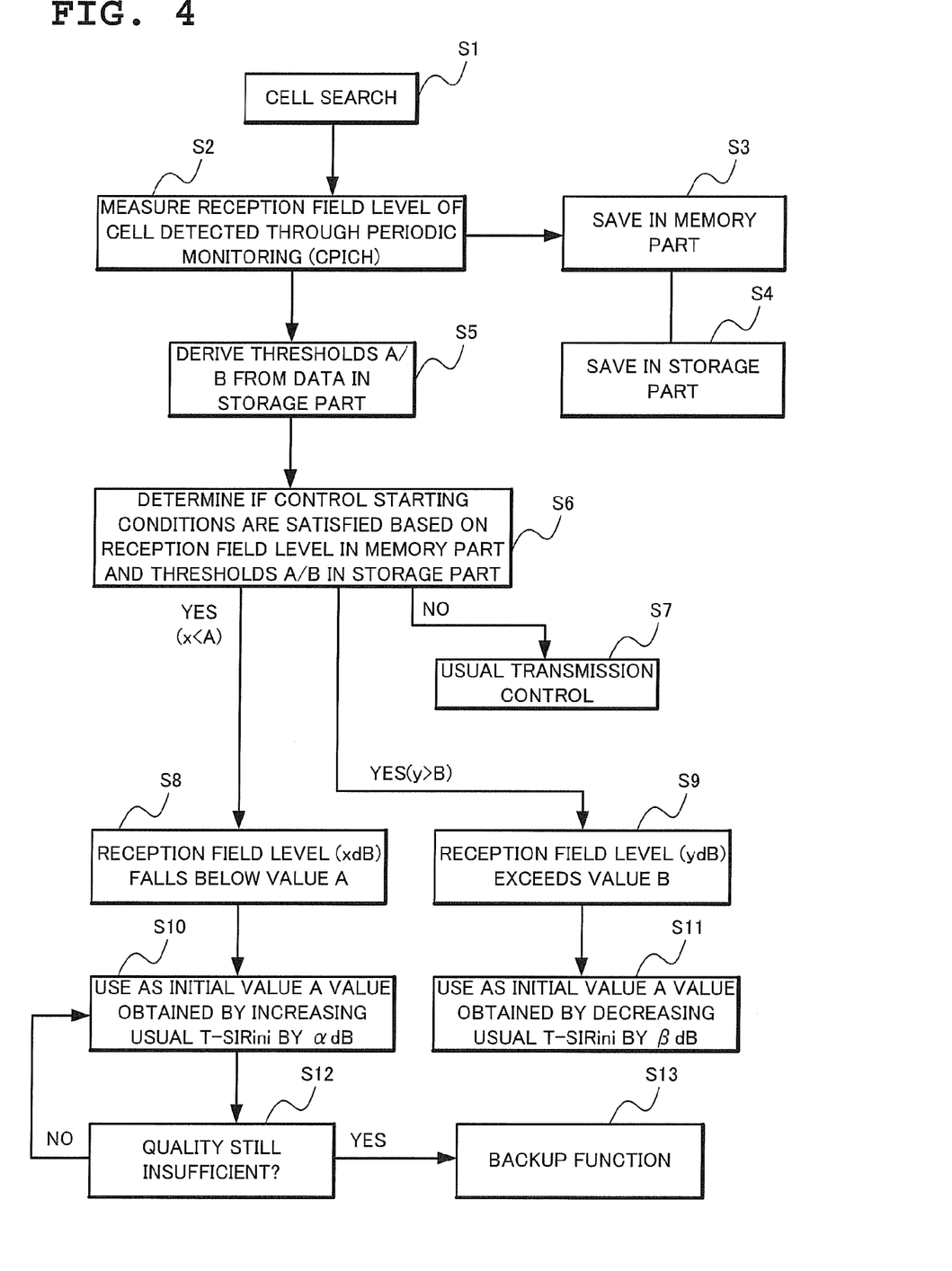
FIG. 4 is a flow chart showing a procedure used by the communication control system according to the first exemplary embodiment.
Figure 5:
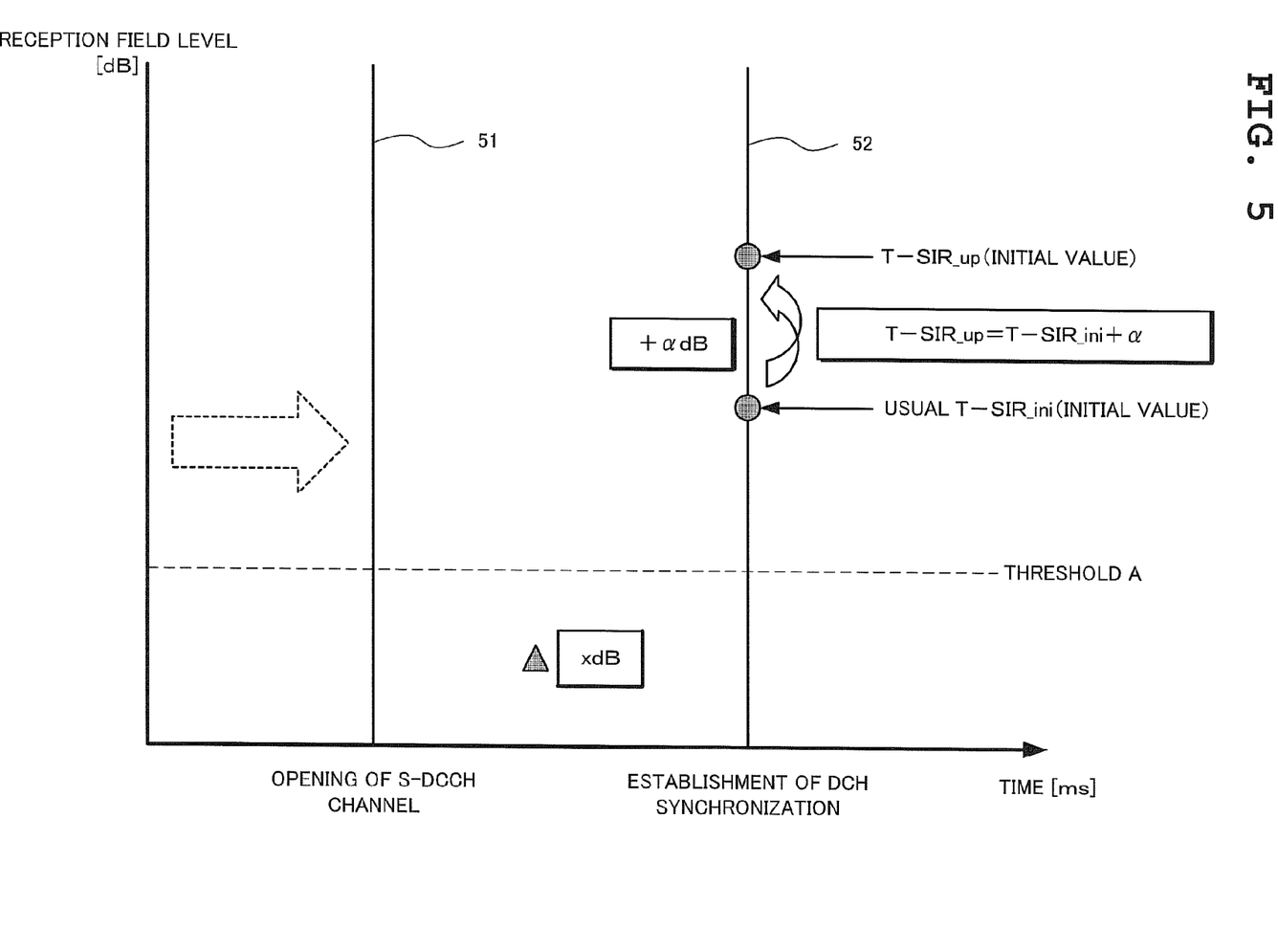
FIG. 5 is a diagram illustrating an upward adjustment of an initial value performed by the communication control system according to the first exemplary embodiment when quality has deteriorated.
Figure 6:
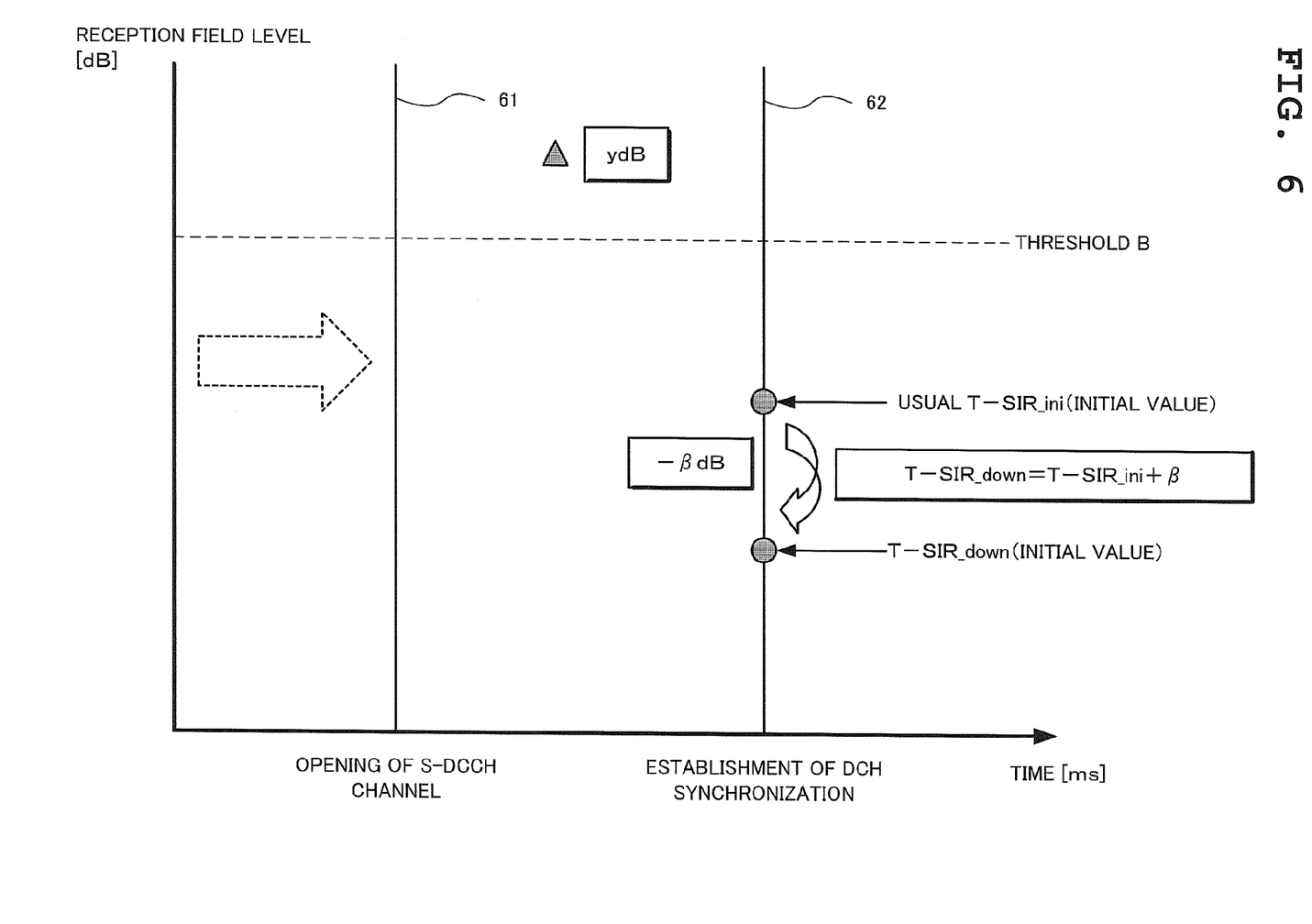
FIG. 6 is a diagram illustrating a downward adjustment of the initial value performed by the communication control system according to the first exemplary embodiment when quality is excessively high.

FIG. 1 is a block diagram of a communication control system to be equipped in a mobile terminal according to a first exemplary embodiment of the invention. FIG. 2 is a diagram showing the electrical configuration of a mobile terminal equipped with the communication control system. FIG. 3 is a diagram showing the configuration of the control part of a mobile terminal equipped with the communication control system. FIG. 4 is a flow chart showing a procedure used by the communication control system. FIG. 5 is a diagram illustrating an upward adjustment of an initial value performed by the communication control system when quality has deteriorated. FIG. 6 is a diagram illustrating a downward adjustment of the initial value performed by the communication control system when quality is excessively high.

The communication control system 1 according to the first exemplary embodiment relates to a system which sets a T-SIR based on a reception field level immediately before DCH synchronization is established. The characterizing portion of the communication control system 1 is that its mechanism is built within a PHY 42 (in FIG. 3), a component of the control part 36 of the mobile terminal shown in FIG. 3.

As shown in FIG. 1, the major components of the characterizing portion are a quality measurement part 12, a target quality setting part 14, a comparison determination part 16 and a target SIR setting part 18. The overall communication control system is configured so as to provide a target SIR (T-SIR) outputted from the target SIR setting part 18 of the characterizing portion to an inner loop of the related art communication control system.

The overall communication control system is configured so that a system in which a T-SIR outputted from the above-described target SIR setting part 18 of the characterizing part is used for transmission power control (the inner loop of the related art communication control system). More specifically, outputs from the above-described target SIR setting part 18 are provided to the comparison determination part 26 of a system, which comprises a back diffusion processing part 20, a Rake reception part 22, an SIR measurement part 24, a comparison determination part 26, and a TPC bit generation part 28 (FIG. 1).

The overall communication control system is configured to operate under control by a program. The program is stored in a storage apparatus (including a memory; not shown) and is configured so that it is read by a processor (not shown) from the storage apparatus and executed by the processor to perform the processes described in detail below.

As shown in FIG. 2, the quality measurement part 12, which is part of the characterizing portion of the first exemplary embodiment, is configured so as to receive from the memory part 38 a reception field level of a signal component representing a specific wireless channel established between a mobile terminal 30 and a base station via the wireless part 34 of the mobile terminal 30 (i.e., a reception field level of CPICH (Common Pilot Channel)) via the wireless part 34 of the mobile terminal 30) and a reception field level and a measured reception quality value of a DPDCH, which has been captured into the control part 36 and written into the memory part 38.

The memory part 38 stores a reception field level (xdB) and a reception field level (ydB) (described later) measured with respect to a CPICH, along with storing a measured reception quality value of a below-described DPCCH.

The target quality output part 14 selects as a threshold A a measured reception quality value (BLER: Block Error Ratio) reported from the processing with respect to DPDCH (measured with respect to DPDCH) when BLER as of a measurement time for reception field level (xdB) with respect to CPICH exceeds T-BLER (tolerable block error rate) by 100% (the number of samples=5) during a period from when S-DCCH (Stand-alone Dedicated Control Channel) opens (opening of the channel) until when DCH synchronization is established, and outputs the threshold A as a reference for an upward adjustment of the initial value when communication quality is poor.

The target quality output part 14 also selects as a threshold B a measured reception quality value reported with respect to DPDCH (measured with respect to DPDCH) when BLER as of a measurement time for reception field level (xdB) with respect to CPICH falls below T-BLER by 100% (the number of samples=10) during a period from the opening of S-DCCH until the establishment of DCH synchronization, and outputs the threshold B as a reference for an downward adjustment of the initial value when communication quality is excessively high.

The comparison determination part 16 compares the reception field level (xdB) at poor communication quality which is provided by the quality measurement part 12 against the threshold A which is provided by the target quality setting part 14, and outputs a T-SIR obtained by adjusting the usual initial value T-SIRini upward by an amount of αdB (described later) if the reception field level (xdB) is below the threshold A.

On the other hand, if a comparison between the reception field level (ydB) at excessive communication quality and the threshold B reveals that the reception field level (ydB) exceeds the threshold B, the comparison determination part 16 outputs a T-SIR obtained by adjusting the previous initial value T-SIRini downward by an amount of βdB (described later).

The target SIR setting part 18 outputs the adjusted T-SIR outputted from the comparison determination part 16.

As described above, while the major portion of the communication control system 1 according to this exemplary embodiment is built within the PHY 42 of the mobile terminal 30's control part 36 as shown in FIG. 3, the mobile terminal 30 schematically comprises, in addition to the control part 36, an antenna 32, a wireless part 34, a memory part 38, a storage part 40 and a display part 42.

The antenna 32 is a unit to transmit and receive radio waves to and from a base station (not shown).

The wireless part 34 is a unit to demodulate an analog electric signal from the antenna 32 into a reception base band signal and to modulate a reception base band signal into an analog electric signal. The wireless part 34 also sends the resultant signal to the antenna 32.

While the major portion of the control part 36 is built within a PHY (Physical) 52 as described above, it has, in addition to a PHY 52, an MAC (Medium Access Control) 54, an RLC (Radio Link Control) 56, an RRC (Radio Resource Control) 58, a BMC (Broadcast/Multicast Control) 60 and a PDCP (Packet Data Convergence Protocol) 62, as shown in FIG. 3.

For proper functioning, the PHY 52 is configured to operate according to instructions from the MAC 54, RLC 56 and RRC 58. An instruction from the RLC 56 is given to the PHY 52 via the MAC 54, while that from the RRC 58 directly to the PHY 52.

The PHY 52 controls mutually with the MAC 54 and the RRC 58, the MAC 54 controls mutually with the RLC 56 and the RRC 58, the BMC 60 does so with the RLC 56 and the RRC 58, and the PDCP 62 with the RLC 56 and the RRC 58. These control processes are already in the public domain and does not have any direct relationship with the present invention.

The memory part 38 operates under control of the control part 36 and serves as a data holding part used to write and read reception field levels and measured reception quality values.

The storage part 40 is a place to save thresholds A and B, based on which whether or not the control according to the present invention should be executed is determined, according to the control by the control part 36. The storage part 40 provides these thresholds to the control part 36.

The display part 42 is a display unit to display data from the control part 36.

Next, the operation of the first exemplary embodiment will be described with reference to FIGS. 1 to 6.

When the operation of the transmission power based communication control function of the control part 36 of the mobile terminal 30 begins to operate, the mobile terminal 30 first searches for cells located within its communicating distance (step S1 in FIG. 4).

In this cell search, cells in the mobile communication network located near the mobile terminal 30 are monitored periodically and the reception field level at the mobile terminal 30 is measured for each cell by the quality measurement part 12 (step S2).

The cell search process is performed using a CPICH. The data of reception field levels and measured reception quality values obtained through measurement of each of the detected cells are stored in the memory part 38 and the storage part 40 (step S3). The above-described thresholds obtained based on the measured reception quality values (e.g., BLER) with respect to the DPDCH at the time of measurement of reception field levels are saved in the storage part 40 (step S4).

In advance of determining whether or not the relationship, immediately before DCH synchronization is established, between the data of reception field level, which was saved in the memory 38 using as a trigger the opening of the S-DCCH (51 in FIG. 5 and 61 in FIG. 6), and the thresholds A and B, which are stored in the storage part 40, satisfies the conditions for starting the control process for the transmission power control function (i.e., determination of execution or non-execution of transmission power control), the target quality setting part 14 derives the thresholds A and B by using the reception field level and BLER in the storage part 40 (step S4).

As a threshold A, the target quality output part 14 selects a measured reception quality value BLER obtained with respect to DPDCH as of a measurement time for reception field level (xdB) with respect to CPICH when BLER exceeds T-BLER (tolerable block error rate) by 100% (the number of samples=5) during a period from the opening of S-DCCH until the establishment of DCH synchronization.

All the data used in the selection of a threshold A are those stored in the storage part 40, which means that a predetermined set of past data are referenced.

As a threshold B, the target quality setting part 14 selects a measured reception quality value BLER obtained with respect to DPDCH as of a measurement time for reception field level (xdB) with respect to CPICH when BLER falls below T-BLER by 100% (the number of samples=10) during a period from the opening of S-DCCH until the establishment of DCH synchronization.

All the data used in the selection of a threshold B are those stored in the storage part 40, which means that a predetermined set of past data are referenced.

The comparison determination part 16 then determines whether or not the relationship between the data of reception field level, saved in the memory 38 using as a trigger the opening of the S-DCCH (51 in FIGS. 5 and 61 in FIG. 6) and given by the quality measurement part 12, and the thresholds A and B, stored in the storage part 40 and given by the target quality part 14, satisfies the control starting conditions for the transmission power control function (i.e., determination of execution or non-execution of transmission power control) (step S6).

There are two control starting conditions: one is that the reception field level exceeds the threshold A and the other is that the reception field level is beyond the range in which it falls below the threshold B.

If both the control starting conditions are not satisfied (NO in step S6), usual transmission control is performed (step S7).

If the reception field level is below the threshold A and if the control starting conditions are met (YES (x<A) in step S6) (step S8), it is determined that quality is poor. In this case, the target SIR setting part 18 sets the initial value of T-SIR used by the transmission power control function, which will be started after the establishment of DCH synchronization, to a value obtained by increasing the usual initial value of T-SIR (T-SIRini) by an increment value ($\alpha$dB) (step S10).

The increment value ($\alpha$dB) is selected according to by how much the reception field level (xdB) measured (reported) during a period from the opening of S-DCCH until the establishment of DCH synchronization falls below the threshold A.

For example, if the reception field level falls below the threshold A by 1 dB, 1 dB is selected as the increment value, and if by 2 dB, 2 dB is selected as the increment value.

If there is more than one measurement of reception field level (xdB) during a period from the opening of S-DCCH until the establishment of DCH synchronization, an average of increment values for all the measurements is selected as the increment value.

The upper limit to which a T-SIR is increased by adjustment is that of the predetermined range (T-SIR=maximum value−minimum value).

The T-SIR resulting from upward adjustment by an increment value ($\alpha$dB) selected as described above is given as usual by the target SIR setting part 18 to the comparison determination part 26 and is used for comparison with the M-SIR from the SIR measurement part 24. The TPC bit generation part 28 maps a TPC bit to the DPCCH, which is the transmitting-side control channel, and thereby sends the result of comparison to the base station.

By selecting an increment value as described above and setting the initial value of T-SIR using such increment value, it becomes possible to increase efficiency in the operation of the transmission power control function (communication control system) because the control of transmission power is performed repeatedly before the establishment of DCH synchronization, with the number of repetitions being decreased after the establishment of DCH synchronization. In other words, it becomes possible to provide a user with a service stably from immediately after the start of the operation of the DCH.

If the system is still not stable enough (quality is insufficient) after increasing the initial value (T-SIRini) by an increment value ($\alpha$dB) as described above (step S12), the system is operated to make a further attempt so as to improve communication quality by sending an uplink message (a message from the mobile terminal to the base station) again. This causes the backup system (backup function) to begin operating (step S13).

The retransmission of an uplink message is performed to provide the base station with an index which represents that a sufficient quality level has not been achieved at the mobile terminal.

If an uplink message must be retransmitted, it means that downlink quality is not sufficient either.

Therefore, when the necessity of retransmission of an uplink message has occurred, T-SIR is set by varying the increment value for T-SIR stepwise from one retransmission to another, for example, by increasing T-SIR at fixed increments. More specifically, T-SIR is incremented by 1 dB at each retransmission.

Using the backup system, it becomes possible to provide a user with a service even more stably from an early point in time, i.e., from immediately after the start of the operation of the DCH, because the transmission power control function (communication control system) operates more efficiently after the establishment of DCH synchronization.

If the reception field level (ydB) is above the threshold B and if the control starting conditions are met (YES (y>B)) in step S5) (step S9), the target SIR setting part 18 sets as the initial value a value obtained by decreasing the usual initial value (T-SIRini) by a decrement value (βdB) (step S11).

The decrement value (αdB) is selected according to by how much the reception field level (ydB) measured (reported) during a period from the opening of S-DCCH until the establishment of DCH synchronization exceeds the threshold B. For example, if the reception field level exceeds the threshold B by 1 dB, 0.5 dB is selected as the increment value, and if by 2 dB, 1 dB is selected as the decrement value.

If there is more than one measurement of reception field level (ydB) during a period from the opening of S-DCCH until the establishment of DCH synchronization, an average of decrement values for all the measurements is selected as the decrement value.

While in this downward adjustment the T-SIR is decreased as described later, an decrease in T-SIR is directly linked with decreased quality. To deal with this problem, the number of samples used in downward adjustment is made larger than that in upward T-SIR adjustment and the curve of downward adjustment rate is set rather mildly.

The lower limit to which a T-SIR is decreased by adjustment is that of a predetermined range (T-SIR=maximum value−minimum value).

The T-SIR resulting from downward adjustment by a decrement value (αdB) selected as described above is given as usual by the target SIR setting part 18 to the comparison determination part 26 and is used for comparison with the M-SIR from the SIR measurement part 24. The TPC bit generation part 28 maps a TPC bit to the DPCCH, which is the transmitting-side control channel, and thereby sends the result of comparison to the base station.

By setting the initial value of T-SIR using a decrement value selected in this manner, it becomes possible to decrease load on the base station with respect to system capacity because the transmission power control function (communication control system) operates efficiently from immediately after the establishment of DCH synchronization.

Thus, according to the first exemplary embodiment, a service can be provided to user quickly and stably because efficiency in transmission power control is improved by setting a T-SIR used in transmission power control during a period from the opening of S-DCCH until the establishment of DCH synchronization to a proper value in an adaptative manner.

Establishing a quick and stable communication control system eliminates the necessity for redundant processes (operations), thereby making it possible to achieve power saving (a decrease in battery consumption) and to elongate the standby time of a mobile terminal.

In addition, wireless resources effective on one mobile communication network can be secured on the base station side because a reception field level before the establishment of DCH synchronization can be used for controlling downlink transmission power from a base station.

Moreover, since transmission power control can be performed efficiently, it is possible to suppress mutual interference between mobile terminals located within the same mobile communication network.

Second Embodiment

The second exemplary embodiment differs from the first exemplary embodiment in the following point. In the first exemplary embodiment, if the reception field level is below the threshold A and if the control starting conditions are met (YES (x<A) in S5 in FIG. 4) (S7), it is determined that quality is poor and the target SIR setting part 18 sets the initial value of T-SIR used by the transmission power control function, which will be started after the establishment of DCH synchronization, to a value obtained by increasing the usual initial value of T-SIR (T-SIRini) by an increment value (αdB) (step S9). In the second exemplary embodiment, however, if the reception field level falls below the threshold A, an upward adjustment in the first exemplary embodiment is performed only after it is determined that the reception quality is insufficient (for example, based on the occurrence of retransmission of a message).

The second exemplary embodiment can perform transmission power control even more efficiently than the first exemplary embodiment.

Third Embodiment

The third exemplary embodiment performs the transmission power control of the first exemplary embodiment according to the battery usage on the mobile terminal.

The above-described control is performed when, for example, the charging level of the battery falls below a predetermined threshold.

According to the third exemplary embodiment, effects equal to the first exemplary embodiment can be achieved by adding battery usage into consideration.

Fourth Embodiment

Figure 7:
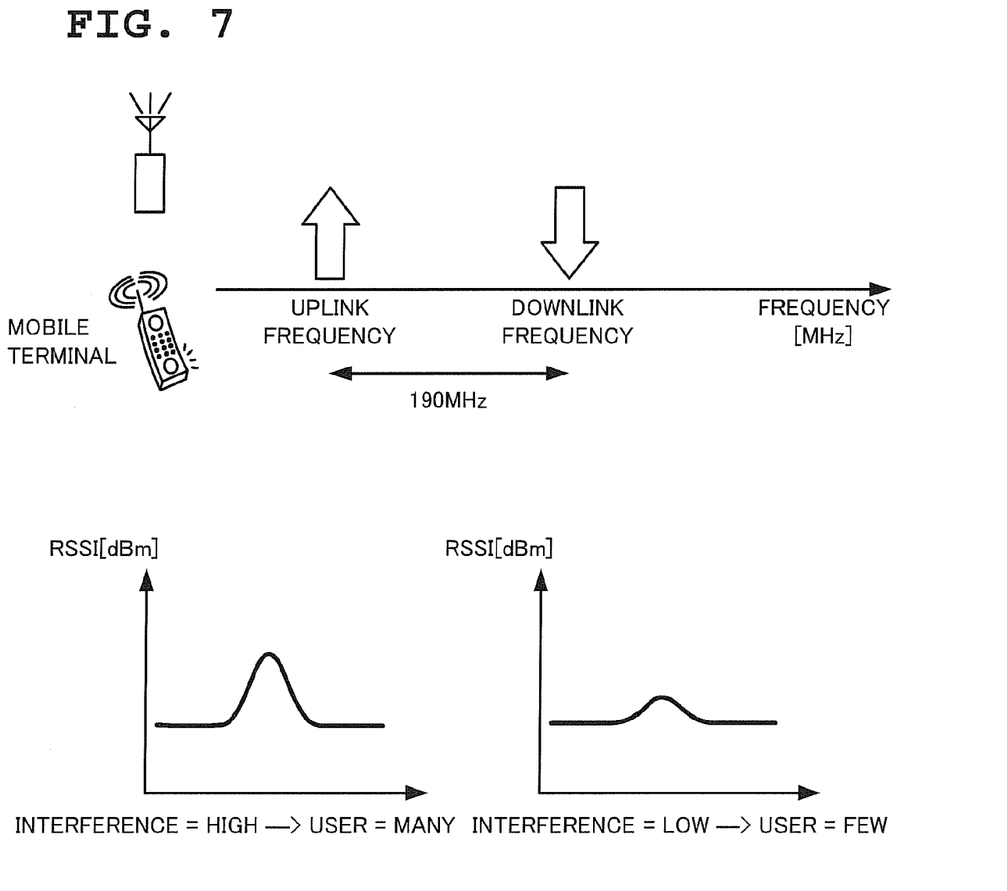
FIG. 7 is a diagram illustrating a communication control system according to a fourth exemplary embodiment.

The fourth exemplary embodiment performs the transmission power control of the first exemplary embodiment according to wireless resource usage on the same mobile communication network For example, the uplink channel is assigned a frequency which is 190 MHz below the frequency of the downlink channel over which a user is receiving a communication service (FIG. 7). The fourth exemplary embodiment measures the RSSI (Receive Signal Strength Indicator), i.e., all power within bandwidth before back diffusion (including interference wave power), with respect to the frequency of the uplink channel (FIG. 7).

Based on the value of RSSI, usage of wireless resources is determined. For example, if there are two or more users within the same mobile communication network, the RSSI value would increase due to interference between radio waves emitted by these users. This increase in the RSSI value is used to trigger transmission power control performed in the first exemplary embodiment.

According to the fourth exemplary embodiment, effects equal to the first exemplary embodiment can be achieved by adding wireless resource usage into consideration.

While several exemplary embodiments of the present invention have been described with reference to the drawings, the concrete configuration of the invention is not limited to these exemplary embodiments but design modifications and other changes within the spirit and scope of the invention are all included in the invention.

For example, the backup system used for the transmission power control performed in the first exemplary embodiment may be modified to perform transmission power control by increasing the increment value for T-SIR stepwisely. For example, after "a" times of repetition of retransmission, the backup system may increment T-SIR by "b" dB for the next transmission power control.

While in the first exemplary embodiment transmission power control is started on the establishment of DCH synchronization, the start of transmission power control may be suppressed depending on the history of transmission power control. For example, the start of transmission power control may be suppressed if there have been no requests for upward or downward adjustment in downlink transmission power control over a consecutive number of segments.

Instead of applying the present invention all the time, whether or not the control of this invention should be performed may be determined every time a communication takes place, periodically or non-periodically, and control may be performed depending on the state of mobile terminal battery or the level of base station system capacity representing a resource on a mobile communication network.

Although both downward and upward adjustments are used in the exemplary embodiments described above, either one only may be used for the transmission power control of the invention.

As described in the foregoing, according to exemplary embodiments of the present invention, when controlling transmission power through a first wireless channel established between a first wireless communication apparatus and a second wireless communication apparatus, the reception condition of a signal received via a second wireless channel established between the first wireless communication apparatus and the second wireless communication apparatus is measured before the first wireless channel is established, and then transmission power for the first wireless channel is controlled according to the reception condition of the measured signal. By this, control efficiency for the wireless channel is increased and it becomes possible to provide a service quickly and stably to a user.

Communication services can be provided at an even higher quality level by configuring the system to set communication quality according to a threshold that is determined based on the signal component described above and a reception error rate.

By achieving such a high communication quality level, it becomes possible for a mobile communication network to establish a quick and stable communication control system between a base station and a mobile terminal, thereby eliminating the necessity for redundant processes (operations), achieving power saving (a decrease in battery consumption) and elongating the standby time of a mobile terminal.

In addition, wireless resources effective on one mobile communication network can be secured on the base station side because the reception field level before the establishment of DCH synchronization can be used for controlling downlink transmission power from a base station.

Moreover, since transmission power control can be performed efficiently, it is possible to suppress mutual interference between mobile terminals located within the same mobile communication network.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-178570, filed on Jun. 17, 2005, the disclosure of which is incorporated herein in its entirety by reference.

The invention claimed is:

1. A communication control method to control transmission power through a first wireless channel which connects between a first wireless communication apparatus and a second wireless communication apparatus, comprising:
    establishing a second wireless channel which connects between said first wireless communication apparatus and said second wireless communication apparatus;
    said second wireless communication apparatus receiving a signal sent from said first wireless communication apparatus via the second wireless channel; and
    controlling signal transmission power through said first wireless channel according to said reception condition of the signal,
    wherein said first wireless communication apparatus is a base station in a mobile communication network;
    said second wireless communication apparatus is a mobile terminal which is connected with said base station via said first wireless channel and said second wireless channel;
    said first wireless channel is a dedicated control channel; and
    said second wireless channel is a common pilot channel,
    wherein the reception condition of said signal from said common pilot channel is a reception field level, and wherein the control of transmission power through said dedicated control channel is performed by increasing and/or decreasing, within a measured signal interference ratio and a target signal interference ratio which are used to control transmission power for said dedicated control channel, said target signal interference ratio according to the relationship between the reception field level of said common pilot channel before the establishment of synchronization of said dedicated control channel and a threshold which is set based on said reception field level and the measured reception quality value of the dedicated physical data channel,
    wherein a first threshold is set based on the reception field level of said common pilot channel and the measured reception quality value of the dedicated physical data channel; and if said reception field level falls below said first threshold, said target signal interference ratio is set to a value increased by a first predetermined value,
    wherein a message is retransmitted if the reception quality is still insufficient after increasing said signal interference ratio by the first predetermined value,
    wherein the first predetermined value is incremented by the predetermined value at every retransmission of said message, and said target signal interference ratio is set to said incremented value.

2. A mobile terminal, comprising a first measurement unit to measure the signal interference ratio of a first wireless channel which is established with a base station; a setting unit to set a target signal interference ratio required for communication via said first wireless channel; and a control unit to control transmission power transmitted from said base station via said first wireless channel based on said signal interference ratio measured by said first measurement unit and said target signal interference ratio set by said setting unit; wherein
    a second measurement unit is provided to measure the reception condition of a signal through a second wireless channel which is established with a base station before said first wireless channel is established; and said target signal interference ratio set by said setting unit is variably set according to the reception condition of said signal which is measured by said second measurement unit, wherein said first wireless channel is a dedicated control channel; said second wireless channel is a common pilot channel; and the reception condition of said signal is a reception field level, wherein said setting unit increases and/or decreases said target signal interference ratio according to the relationship between said reception field level of said common pilot channel and a threshold which is set based on said reception field level and the measured reception quality value of the dedicated physical data channel, wherein said setting unit includes a threshold setting unit to output a first threshold which is set based on the reception field level of said common pilot channel and the measured reception quality value of the dedicated physical data channel; and if said reception field level falls below said first threshold, said target signal interference ratio is set to a value increased by a first predetermined value, wherein said setting unit includes a message retransmission unit to retransmit a message if the reception quality is still insufficient after increasing said signal interference ratio by the first predetermined value, wherein the first predetermined value is incremented by the predetermined value at every retransmission of said message by said retransmission unit, and said target signal interference ratio is set to said incremented value.

3. The mobile terminal according to claim 2, wherein said first threshold is selected as said measured reception quality value as of a measurement time for said reception field level when the measured reception quality value exceeds a tolerable reception quality value by 100%.

4. The mobile terminal according to claim 2, wherein said setting unit includes a threshold setting unit to output a second threshold higher than said first threshold which is set based on the reception field level of said common pilot channel and the measured reception quality value of the dedicated physical data channel; and if said reception field level exceeds said second threshold, said target signal interference ratio is set to a value decreased by a second predetermined value.

5. The mobile terminal according to claim 4, wherein said second threshold is selected as said measured reception quality value as of a measurement time for said reception field level when the measured reception quality value falls below a tolerable reception quality value by 100%.

6. The mobile terminal according to claim 3, wherein said measured reception quality value is a reception error rate.

7. The mobile terminal according to claim 2, wherein said setting unit sets said target signal interference ratio by increasing and/or decreasing said target signal interference ratio when the setting unit determines that communication quality is not sufficient.

8. The mobile terminal according to claim 2, wherein said setting unit sets said target signal interference ratio by increasing and/or decreasing said target signal interference ratio when the setting unit determines that battery usage exceeds a predetermined usage level.

9. The mobile terminal according to claim 2, wherein said setting unit sets said target signal interference ratio by increasing and/or decreasing said target signal interference ratio when the setting unit determines that the condition of wireless resources exceeds a predetermined condition of wireless resources.

10. The mobile terminal according to claim 2, wherein said setting unit sets said target signal interference ratio in such a manner that the start of setting control is suppressed according to the history of transmission power control.

11. The mobile terminal according to claim 2, wherein said setting unit sets said target signal interference ratio periodically or non-periodically according to battery usage on the mobile terminal or system capacity on the base station.

12. A non-transitory computer-readable storage medium storing a control program, wherein execution of said control program by a computer causes the computer to perform the communication control method of claim 1.

13. A non-transitory computer-readable storage medium storing a control program, wherein execution of said control program by a computer causes the computer to control the mobile terminal of claim 2.

* * * * *